United States Patent
Faerber et al.

(10) Patent No.: US 9,451,510 B2
(45) Date of Patent: Sep. 20, 2016

(54) RELAY NODE CONFIGURATION IN PREPARATION FOR HANDOVER

(75) Inventors: Michael Faerber, Wolfratshausen (DE); Simone Redana, Munich (DE); Wolfgang Zirwas, Munich (DE); Xiaoben He, Espoo (FI); Jacek Gora, Wroclaw (PL); Krystian Safjan, Nowy Sacz (PL)

(73) Assignee: Nokia Solutions and Networks Oy, Espoo (FI)

( * ) Notice: Subject to any disclaimer, the term of this patent is extended or adjusted under 35 U.S.C. 154(b) by 546 days.

(21) Appl. No.: 13/977,336

(22) PCT Filed: Dec. 28, 2010

(86) PCT No.: PCT/EP2010/070778
§ 371 (c)(1),
(2), (4) Date: Aug. 30, 2013

(87) PCT Pub. No.: WO2012/089237
PCT Pub. Date: Jul. 5, 2012

(65) Prior Publication Data
US 2013/0337811 A1  Dec. 19, 2013

(51) Int. Cl.
  *H04Q 7/20* (2006.01)
  *H04W 36/00* (2009.01)
  *H04W 84/00* (2009.01)

(52) U.S. Cl.
  CPC ..... *H04W 36/0083* (2013.01); *H04W 36/0072* (2013.01); *H04W 84/005* (2013.01); *H04W 84/047* (2013.01); *H04W 92/20* (2013.01)

(58) Field of Classification Search
  CPC .. H04W 36/0072; H04W 12/06; H04W 4/20
  USPC ......... 455/436, 437, 439, 440, 441; 370/331
  See application file for complete search history.

(56) References Cited

U.S. PATENT DOCUMENTS

| | | | | |
|---|---|---|---|---|
| 2009/0290555 A1* | 11/2009 | Alpert | ..................... | H04W 4/20 370/331 |
| 2010/0130242 A1* | 5/2010 | Hayashi | ................ | H04W 12/06 455/517 |
| 2010/0272067 A1* | 10/2010 | Lu | ..................... | H04W 36/0072 370/331 |

FOREIGN PATENT DOCUMENTS

| | | | | |
|---|---|---|---|---|
| SE | WO 2009088339 A1 * | 7/2009 | ............ | H04W 28/22 |
| WO | WO 2009/088339 A1 | 7/2009 | | |
| WO | WO 2010/121661 A1 | 10/2010 | | |

OTHER PUBLICATIONS

ETSI TS 136 300 V9.5.0 (Oct. 2010), "LTE; Evolved Universal Terrestrial Radio Access (E-UTRA) and Evolved Universa Terrestrial Radio Access Network (E-UTRAN); overall description; Stage 2 (3GPP TS 36.300 version 9.5.0 Release 9)", 179 pgs.

*Primary Examiner* — Charles Appiah
*Assistant Examiner* — Randy Peaches
(74) *Attorney, Agent, or Firm* — Harrington & Smith

(57) ABSTRACT

A method of initiating configuration of at least one station includes receiving capability information of at least one second base station when the at least one station is within a cell area of a first base station. The method also includes determining some configuration information of the at least one station based on the received capability information. Configuring the at least one station according to the configuration information before the at least one station is handed over from the first base station to the at least one second base station is then initiated.

23 Claims, 5 Drawing Sheets

RELAY NODE CONFIGURATION IN PREPARATION FOR HANDOVER

The invention relates to configuring one or more stations, such as a relay node and in particular, but not exclusively limited to configuring one or more stations before handover between donor base stations.

A communication system can be seen as a facility that enables communication sessions between two or more entities such as mobile communication devices and/or other stations associated with the communication system. A communication system and a compatible communication device typically operate in accordance with a given standard or specification which sets out what the various entities associated with the system are permitted to do and how that should be achieved. For example, the manner how the communication device can access the communication system and how communications shall be implemented between communicating devices, the elements of the communication network and/or other communication devices is typically defined.

In a wireless communication system at least a part of communications between at least two stations occurs over a wireless link. Examples of wireless systems include public land mobile networks (PLMN), satellite based communication systems and different wireless local networks, for example wireless local area networks (WLAN). In wireless systems an access node is provided by a base station. The radio coverage area of a base station is known as a cell, and therefore the wireless systems are often referred to as cellular systems. In some systems a base station access node is called Node B (NB) or an enhanced Node B (eNB).

A user can access the communication system by means of an appropriate communication device. A communication device of a user is often referred to as user equipment (UE). A communication device is provided with an appropriate signal receiving and transmitting arrangement for enabling communications with other parties. A communication device may be arranged to communicate, for example, data for carrying communications such as voice, electronic mail (email), text message, multi-media, for enabling internet access and so on. Users may thus be offered and provided numerous services via their communication devices. The communication connection can be provided by means of one or more data bearers.

In wireless systems a communication device provides a transceiver station that can communicate with the access node and/or another communications device. A communication device or user equipment may also be considered as being a part of a communication system. In certain applications, for example in ad-hoc networks, the communication system can be based on use of a plurality of user equipment capable of communicating with each other.

A feature of wireless communication devices is that they offer mobility for the users thereof. A mobile communication device, or mobile device for short, may also be transferred, or handed over, from a base station to another and even between base stations belonging to different systems.

3$^{rd}$ Generation Partnership Project (3GPP) is standardizing an architecture that is known as the long-term evolution (LTE) of the Universal Mobile Telecommunications System (UMTS) radio-access technology. The aim is to achieve, inter alia, reduced latency, higher user data rates, improved system capacity and coverage, and reduced cost for the operator. A further development of the LTE is referred to herein as LTE-Advanced (LTE-A). The LTE-Advanced aims to provide further enhanced services by means of even higher data rates and lower latency with reduced cost. The various development stages of the 3GPP LTE specifications are referred to as releases.

An aspect of controlling communications by mobile devices is known as mobility management. Mobility management provides control of active mobile devices moving within a certain area. In cellular systems mobility management is provided by a particular control entity. For example, in LTE each access system is provided with a mobility management entity (MME). A MME control node is involved, among other things, in idle mode user equipment tracking and paging procedures including retransmissions, in bearer activation/deactivation processes and in choosing a signalling gateway (SGW) for a user equipment at the initial attach and at time of intra-LTE handover involving core network (CN) node relocation.

Since the new spectrum bands for international mobile telecommunications (IMT) contain higher frequency bands and LTE-Advanced is aiming at a higher data rate, coverage of one base station may be limited due to the high propagation loss and limited energy per bit. Relaying has been proposed as a possibility to enlarge the coverage. Apart from this goal of coverage extension, introducing relay concepts may also help in the provision of high-bit-rate coverage in a high shadowing environment, reducing average radio-transmission power at the user equipment. This may provide improved battery life, enhanced cell capacity and effective throughput. Relaying may also reduce deployment costs of radio access networks (RAN).

Relaying can be provided by entities referred to as relay stations (RSs) or relay nodes (RNs). The relay nodes can be fixed or mobile, for example mounted to a high-speed train, busses, ferries and the like. In some systems the relay stations may be opportunistically available user equipment/mobile devices that are not owned by the network itself. Relay nodes may be organised into groups, for example into a co-operative cell group (CCG).

A fixed relay node can have a wireless inband or outband backhaul link to a base station such as a donor enhanced node B (DeNB). The backhaul radio link of a fixed relay node can be optimized during installation and communication devices in the coverage area of the relay node can experience a connection quality similar to that in the cell area of the base station. For example the quality of the radio link of the communication device to the relay node can be affected by communication device mobility and position of the communication device in the relay node coverage area. Handling mobility of the communication devices from one donor eNB/RN to another donor eNB/RN can be achieved on an individual basis.

A moving relay node can also have a wireless inband or outband backhaul link to a base station. However, in this case the backhaul link between the relay node and the base station can be subject to issues affected by mobility. For example, the backhaul link can be a radio link featuring full mobility. Communication devices in a moving cell can have similar channel profiles and a static relationship with the moving relay node so long as the communication device moves with the moving relay node. For example, the communication device can remain static with respect to a moving relay node installed on a vehicle so long as the communication device does not leave the vehicle.

The quality and capabilities of a radio link between a communication device and the relay node can be dependent on the movement of the backhaul link between different donor eNBs. Capabilities of a donor eNB which a relay node belongs to can differ from capabilities of a donor eNB the relay node is about to handover to. Some techniques have been proposed to avoid severely affecting the service to communication devices in the cell area of the relay node when the relay node moves between different eNBs.

One known method of managing mobility of a relay node from a source donor eNB to a target donor eNB involves providing a list of donor cells which a moving relay node passes through and information of those donor cells. However, this method can break down if the list is not kept up to date. Additionally, if the moving relay node passes through a previously unknown or an unscheduled donor cell, no information of the unscheduled donor cell may be known.

Another known way of supporting moving relay nodes comprises reserving radio resources within a donor base station to be used exclusively by moving relay nodes for backhauling and access. However, there may be problems if the capacity of the reserved resources are not enough to serve the moving relay node. For example, a donor base station may already be supporting other moving relay nodes. Other conditions may also affect the ability of a donor base station to serve a moving relay node such as propagation conditions and even the load of the moving relay node. Reserving resources of a base station exclusively for use of a moving relay node also can be inconvenient because these resources are wasted when the moving relay node is not within coverage of the base station. Furthermore providing reserved resources can be even harder if the donor base station reserves resources for a plurality of moving relay nodes.

It is noted that the above discussed issues are not limited to any particular communication environment, but may occur in any appropriate communication system.

Embodiments of the invention aim to address one or several of the above issues.

In accordance with an embodiment there is provided a method of initiating configuration of at least one station comprising; receiving capability information of at least one second base station when the at least one station is within a cell area of a first base station; determining some configuration information of the at least one station based on the received capability information; and initiating configuring of the at least one station according to the configuration information before the at least one station is handed over from the first base station to the at least one second base station.

In accordance with a more detailed embodiment, the capability information can received from the at least one second base station at the first base station and the first base station determines at least a part of the configuration information of the at least one station. The method may comprise sending the configuration information to the at least one station to initiate configuring the at least one station.

Optionally the capability information can be received from the at least one second base station at the at least one station and the at least one station determines at least a part of the configuration information of the at least one station. In a more detailed embodiment the method can comprise receiving at least a part of the configuration information for the at least one station from the first base station.

The at least one station can be one or more of the following; a relay node, an access node, a mobile station and a base station.

In another embodiment the method can comprise initiating handing over the at least one station from the first base station to the at least one second base station. The at least one station may be moving from the first base station to the at least one second base station.

Optionally, the method can comprise determining differences between the capability of the first base station and the at least one second base station. The determining configuration information can further comprise determining reconfiguration information based on the capability differences between the first base station and the at least one second base station. Additionally or alternatively the determining the configuration information can comprise determining the available capacity of the at least one second base station. Further the determining configuration information can comprise determining reconfiguration information to modify the load of the at least one station to match the available capacity of the at least one second base station.

The capability information of the at least one second base station can comprise one or more of the following: the cell configuration of at least one second base station, the size of at least one second base station, the wireless technologies available at the at least one second base station, one or more frequency bands used by the at least one second base station, carrier aggregation capabilities used in the at least one second base station, the network topology at the at least one second base station, and load of the at least one second base station, the backhaul sub-frame allocation of at least one second base station, the amount of reserved radio resources for moving at least one station at the at least one second base station, the number of connected fixed and moving at least one station respectively at the at least one second base station, the maximum number of supported moving at least one station at the at least one second base station, the frequency bands used by connected fixed and moving at least one station at the at least one second base station.

The capability information of a plurality of second base stations can be received. The capability information of the plurality of second base stations can be received from one of: a plurality of second base stations and a single second base station. The cell areas of the second base stations can overlap. The method can further comprise selecting a second base station to which the at least one station is to be handed over based on the received capability information of a plurality of second base stations. The selecting can comprise selecting the second base station based on one or more of the following: the size of the second base station and the speed of the at least one station. The capability information for the plurality of second base stations can comprise capability information for a series of second base stations, whereby cell areas of the second base stations are located along a movement path of the at least one station.

In some detailed embodiments the method can comprise estimating the time and or the location of the relay node when handover of the at least one station occurs. The method can comprise sending information comprising handover estimates for preparing one or more second base stations for handover of the at least one station.

Optionally a vehicle comprises the at least one station. The method can comprises receiving the capability information from one or more other vehicles in at least one second base station. The capability information can be received from one or more other stations in the second base station.

In accordance with an embodiment there is provided a method of initiating configuration of at least station comprising; sending capability information of at least one second base station when the at least one station is within a cell area of a first base station, the capability information being for determining configuration information of the at least one station for configuring the at least one station according to the configuration information before the at least one station is handed over from the first base station to the at least one second base station.

Optionally the method can comprise initiating sending capability information in response to an indication that the at least one station is to be handed over to the at least one second base station. Additionally or alternatively the method can comprise sending the capability information to a plurality of other base stations and/or to a plurality of stations.

In accordance with yet another embodiment there is provided an apparatus for initiating configuration of at least one station comprising; means for receiving capability information of at least one second base station when the at least one station is within a cell area of a first base station; means for determining some configuration information of the at least one station based on the received capability information; and means for initiating configuring of the at least one station according to the configuration information before the at least one station is handed over from the first base station to the at least one second base station.

In accordance with yet another embodiment there is provided an apparatus comprising at least one processor and at least one memory including computer program code, the at least one memory and computer program code configured to with the at least one processor cause the apparatus at least to receive capability information of at least one second base station when the at least one station is within a cell area of a first base station; determine some configuration information of the at least one station based on the received capability information; and initiate configuring of the at least one station according to the configuration information before the at least one station is handed over from the first base station to the at least one second base station.

In accordance with yet another embodiment there is provided a relay node comprising an apparatus for initiating configuration of at least one station as described above.

In accordance with yet another embodiment there is provided a base station comprising an apparatus for initiating configuration of at least one station as described above.

In accordance with yet another embodiment there is provided an apparatus for initiating configuration of at least one station comprising; means for sending capability information of at least one second base station when the at least one station is within a cell area of a first base station, the capability information being for determining configuration information of the at least one station for configuring the at least one station according to the configuration information before the at least one station is handed over from the first base station to the at least one second base station.

In accordance with yet another embodiment there is provided an apparatus comprising at least one processor and at least one memory including computer program code, the at least one memory and computer program code configured to with the at least one processor cause the apparatus at least to send capability information of at least one second base station when the at least one station is within a cell area of a first base station, the capability information being for determining configuration information of the at least one station for configuring the at least one station according to the configuration information before the at least one station is handed over from the first base station to the at least one second base station.

A computer program comprising program code means adapted to perform the methods may also be provided.

Various other aspects and further embodiments are also described in the following detailed description and in the attached claims.

The invention will now be described in further detail, by way of example only, with reference to the following examples and accompanying drawings, in which.

In the following certain exemplifying embodiments are explained with reference to wireless or mobile communication systems serving mobile communication devices. Before explaining in detail the certain exemplifying embodiments, certain general principles of a wireless communication system and the nodes thereof are briefly explained with reference to FIGS. 1 to 3 to assist in understanding of the herein described embodiments.

Figure 1:
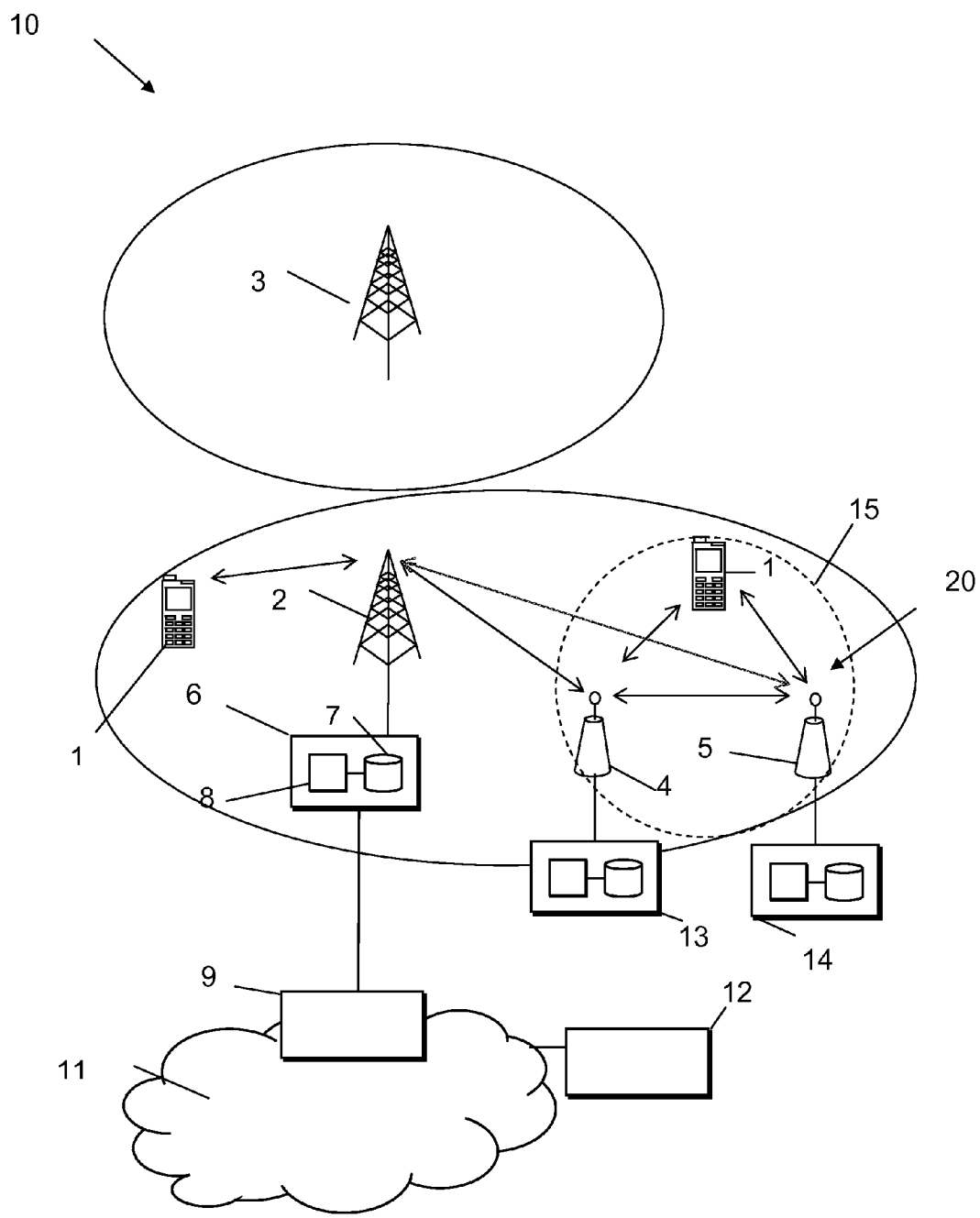
FIG. 1 shows a schematic representation of a network according to some embodiments.

In a communication system 10 a user can be provided with a mobile communication device 1 that can be used for accessing various services and/or applications. The access can be provided via an access interface between the mobile communication device 1 and an appropriate wireless access system of a communication system 10 comprising an access node. An access node can be provided by a base station. FIG. 1 shows part of a radio access network (RAN), including a base station 2. The term base station will be used in the following and is intended to include the use of any of these network access nodes or any other suitable access node. The communication system 10 also comprises a mobility management entity (not shown). The mobile management entity and the base station node 2 can be connected, for example, by means of a S1 interface.

An appropriate mobile user device or station may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device is often called a user equipment (UE). Each mobile device 1 and base station 2 may have one or more radio channels open at the same time and may receive signals from more than one source.

FIG. 1 shows a base station 2 having a cell area associated therewith and the base station 2 is connected to relay nodes 4, 5. Each relay node can establish a connection to the base station 2 or alternatively the relay nodes can share the same backhaul link. In the cell area of the base station 2, there can be provided two relay nodes 4 and 5, but it is noted that this is by way of example only. In practice there may be more or less than two relay nodes. In relaying a relay node (RN) is wirelessly connected to the radio-access network via a donor cell, that is the cell of base station 2 of FIG. 1. FIG. 1 also shows a neighbouring donor cell provided by another base station 3 which the relay nodes 4, 5 are not connected to.

Figure 2:
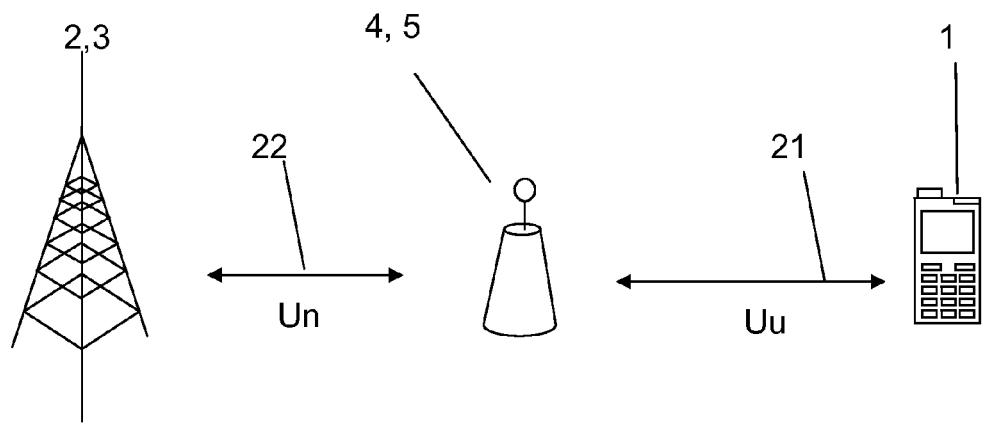
FIG. 2 shows a schematic representation of a relay node relaying information from a base station to a communication device according to some embodiments.

The basic principle of relaying is shown in FIG. 2. Relay nodes may be used, for example, in block of flats and other buildings, offices, warehouses and/or factories and/or in public places, for example in shopping malls, sports or exhibition halls or arenas, particular areas of cities, on moving platforms such as trains, ships, busses, aeroplanes and so on. FIG. 2 shows communication interfaces in a relay arrangement. The wireless interface 21 between user equipment 1 and a relay node 4 and/or 5 can be provided by an Uu interface. The wireless interface 6 between the relay nodes 4, 5 and the donor base station 2 can be provided by an Un interface. The link 22 between a relay node and donor base station is often called a backhaul link. In some embodiments a backhaul link between a relay node 4 can be shared by one or more other relay nodes 5 in a relay node group 20. FIG. 1 shows backhaul links between both the relay nodes 4, 5. Alternatively each relay node 4, 5 in a relay node group can establish a backhaul link with the base station 2.

Each of the relay nodes has a coverage area associated therewith. The coverage area may be smaller than the cell of the base station 2, of a similar size to the cell or larger than the cell. For the purposes of clarity the coverage area of each of the relay nodes 4, 5 has not been shown. Instead the coverage area 15 of the relay node group 20 has been shown. In some embodiments the relay node group 20 can be a single relay node e.g. relay node 4, in which case the coverage area 15 is the coverage area of the relay node 4. A relay link known as backhaul can be provided between each relay node and the base station. The user equipment 1 in the cell area is able to communicate directly with the base station 2 or with the base station via a respective relay node 4, 5 depending on the location of the user equipment 1. In particular, if the user equipment 1 is in the coverage area associated with a relay node 4, 5, the user equipment may communicate with the relay node(s) 4, 5.

By way of example only, it is noted that the relay nodes 4, 5 can in certain applications have lower transmission power compared to base station 2. The base station 2 can be, for example, a macro NodeB or an eNB. The relay nodes can comprise cheaper radio frequency (RF) components such as oscillators and filters, due to relaxed requirements in standards. For example, the transmission power of a relay node can be about 100 times lower compared to the transmission power of an eNB and frequency stability requirements can be between the requirements of an eNB and a user equipment. The transmission and reception range for the relay nodes 4, 5 may be adapted to small range scenarios.

The relay nodes 4, 5, can be relatively low power nodes that may be deployed to provide enhanced indoor coverage, additional capacity at hotspots or cell edge regions. For example, in the case of indoor deployment, such an access point or node may be provided for example in apartment blocks or office buildings and hence there may be a relatively high density of such access nodes.

Returning to FIG. 1, there is shown a gateway function 9 of the communication system 10 connecting a core network 11 and/or another network, application functions or services 12. A packet data network may also be provided by means of appropriate gateway nodes. Regardless of the gateway arrangement, a communication device 1 can be connected to an external data network, for example the internet via the relay nodes 4, 5 and/or the base stations 2, 3.

Figure 3:
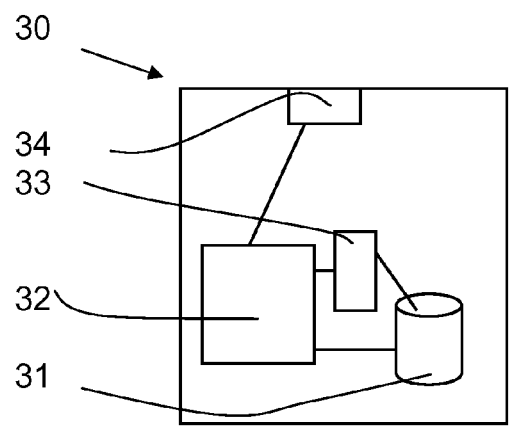
FIG. 3 shows a schematic representation of a control apparatus according to some embodiments.

The base stations 2, 3 can be typically controlled by at least one appropriate controller apparatus 6. The relay nodes 4, 5 are also typically controlled by at least one appropriate controller apparatus 13, 14. FIG. 3 shows an example for a controller apparatus for the relay nodes 4, 5 or the base stations 2, 3. The controller apparatus 6 is typically provided with at least one memory 31, at least one data processor 32 and an input/output interface 34 as shown in FIG. 3. The control apparatus 6 of the base station 2 or the relay nodes 4, 5 can further comprise a mobility management block 33. The control apparatus 6 can be configured to execute appropriate software applications to provide the desired control functions. The control apparatus 6, when provided in a node and comprising at least one memory and computer program code can be configured, with the at least one processor, to cause a relay node of a group of relay nodes to communicate with the access system of the communication system 10 on the behalf of another relay node of the group serving the mobile device and/or to communicate control information with other relay nodes in the group and/or maintain information about active mobile devices in the group, as will be explained in more detail below. At least some of the processing blocks may be carried out by one or more processors in conjunction with one or more memories. The processing block may be provided by an integrated circuit or a chip set. The control apparatus can be interconnected with other control apparatuses.

The mobile communication devices 1 can access the communication system 10 based on various access techniques, such as code division multiple access (CDMA), or wideband CDMA (WCDMA), the latter technique being used by some communication systems based on the third Generation Partnership Project (3GPP) specifications. For LTE and LTE-A, OFDMA (Orthogonal Frequency Division Multiplexing) in the DL (down link) and single-carrier FDMA in the UL (uplink) can be used. Other examples include time division multiple access (TDMA), frequency division multiple access (FDMA), space division multiple access (SDMA) and so on. In a wireless system a network entity such as a base station 2 provides an access node for the communication devices 1.

A non-limiting example of mobile architectures where the herein described principles may be applied is known as the Evolved Universal Terrestrial Radio Access Network (E-UTRAN). Non-limiting examples of appropriate access nodes are a base station of such system, for example what is known as NodeB or eNB in the vocabulary of the 3GPP specifications. Other examples include base stations of systems that are based on technologies such as wireless local area network (WLAN) and/or WiMax (Worldwide Interoperability for Microwave Access). Access nodes can provide cellular system level base stations providing E-UTRAN features such as user plane Radio Link Control/Medium Access Control/Physical layer protocol (RLC/MAC/PHY) and control plane Radio Resource Control (RRC) protocol terminations towards mobile communication devices.

The relay nodes 4, 5 of FIG. 1 can form a portion or all of a relay system based on a relay node group 20 such as a co-operative cell group (CCG). The co-operative cell group is arranged to be connected and relayed to a DeNB, for example base station 2. The co-operative relay system is a smart co-operative relay system that is based on the notion of having a close group of relay nodes, often deployed together for a particular common service area or space such as an indoor office (fixed relays) or a passenger train (moving relays). The relay nodes of the CCG are interconnected and wireless links can be provided between the base stations 2, 3 and one or more of the relay nodes 4 and 5.

The relay nodes 4, 5 may be inter-connected with a relay node to relay node (RN-RN) cooperative interface. This interface may be realized using either a wire-line interface (for example such as the X2 interface or a similar interface) or a wireless interface. The wireless interface can be arranged to operate on a different spectrum band than that of the donor cellular system (out of band) to avoid interference. A part of the relay node to relay node (RN-RN) link can be used for the normal cooperative functions such as cooperative multiple input multiple output (MIMO), network coding, and so on. The link can also be used to other purposes such as load balancing, signalling cell changes, notifications, warnings, and so on.

A principle of the co-operative relays is to explore and utilize different diversities such as notable time-space and user diversities associated with the close cooperative group of relay nodes or cooperative cell group. The close group can be employed in different deployment scenarios in order to improve radio resource utilization on the wireless backhaul for better or more optimized network operation and performance. A relay node 4 connected to the donor base station 2 can act as anchor point. In some embodiments opaque mobility management can be used for optimizing inter-relay node handover, which is hidden to the donor cellular system.

In the relay node group 20 shown in FIGS. 1 and 2, a first relay node 4 is connected to a second relay node 5. The second relay node 5 has a connection with the mobile device 1. Should a need for handover arise, the mobile device 1 could be handed over from the first relay node to another relay node (not shown). A cooperative-relay interface between the first and second relay nodes 4, 5 inside the relay node group 20 can be used to enable further enhancement and optimization for the connection mobility management of active user equipments moving inside a relay node group coverage area. The mobility management can include inter-cell handover (HO) procedure between neighbouring relay node cells of the co-operative cell group. A non-limiting example of the interface that can be used for this purpose and other communication is a Cooperative Relay X2 interface (crX2) between the relay nodes.

In the relay node group 20 the interconnected relay nodes 4, 5 can share relay-link or wireless backhaul capacity in an efficient, coordinated and controlled manner. The relay nodes 4, 5 can be connected and relayed to the same or to a different neighbouring donor base station 3. Such an arrangement may be used, for example, where a plurality of relay nodes is provided to enhance cellular coverage and/or in embodiments that relate to relay-enhanced cellular networks, for example 3GPP LTE-A Release 10 and beyond enabled systems.

In some circumstances one or more relay nodes can be installed on a moving train, bus, tram, ferry or any other suitable vehicle on which communication devices 1 may need to communicate with the access communication network 10. One or more of the relay nodes 4, 5 in the relay node group may establish a backhaul link 22 with a first base station 2. In this way, the coverage area of the relay node or relay node group is also moving though the cell area of the first base station 2. In some embodiments there can be only one relay node moving in the service cell area of the first base station 2, but in other embodiments there may be a co-operative group of a relay nodes moving in the cell area of the first base station 2. The first base station can be a donor eNB (DeNB) for providing suitable access for one or more relay nodes 4, 5 of the relay node group 20. The relay node group 20 may need to handover from the first base station 2 to the second base station 3 when the relay node group 20 moves from the cell service area of the first base station 2 to the cell service area of the second base station 3. The movement of backhaul link 22 of the relay node group 20 to the access communication network 10 can be managed in such a way that communication devices 1 in communication with the relay node group 20 do not perceive movement of the backhaul link 22 or alternatively the constraints of movement of the backhaul link 22 are mitigated.

Figure 4:
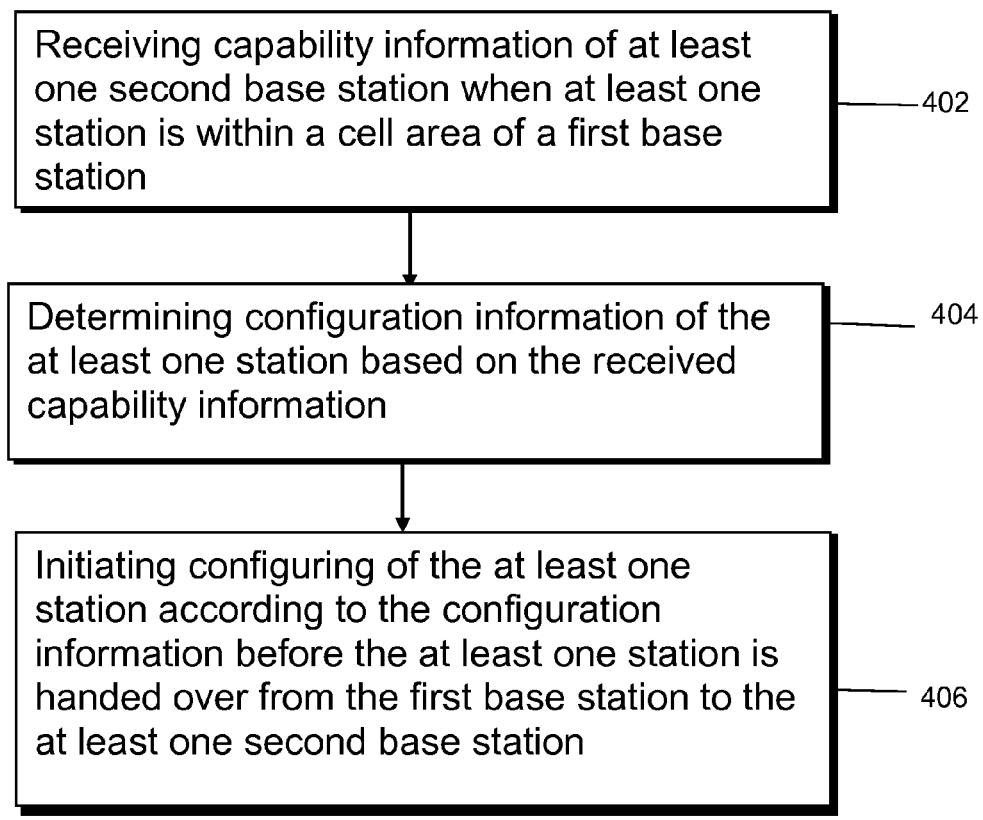
FIG. 4 shows a flow diagram of a method according to some embodiments.

In some embodiments capability information of at least one second base station 3 is received when at least one station or relay node 4 is within a cell area of a first base station 2 as shown in block 402 of FIG. 4. In some embodiments any means suitable can receive the capability information. In this way the second base station 3, which can be a "target" donor eNB sends information to the first base station 2, which can be a "source" DeNB, and to at least one relay node 4. In some embodiments, the capability information of the second base station 3 can be sent to the first base station 2 and the control apparatus 6 of the first base station can be configured to process the capability information with the processor 32. Furthermore, the capability information can be sent to the relay node 4 and the control apparatus 13 of the relay node 4 is configured to process the capability information with the processor 32. Indeed, the capability information can also be sent to the control apparatus 14 of the second relay node 14 or any other relay node in the cell area of the first base station 2. When the control apparatus 13 of the first relay node 4 is referred to hereinafter the control apparatus of one or more other relay nodes such as the second relay node can additionally or alternatively also carry out the same method.

Once the control apparatus 6 of the first base station 2 and the control apparatus 13 of the first relay node 4 have received the capability information of the second base station 3, the processors 32 at first base station 2 and at the first relay node 4 are configured to the determine configuration information of the relay node 4 based on the received capability information as shown in block 404 of FIG. 4. In some embodiments any means suitable can be used to determine the configuration information based on the capability information. The configuration can be partly determined at the base station 2, for example, the sub-frames used for backhauling 22, and can be partly determine at the relay node 4, for example, the frequency band used on the access link 21. In some embodiments the configuration information can be determined for one or more relay nodes 4, 5 of the relay node group 20. In some embodiments the configuration information can be determined individually for each relay node or alternatively for all the relay nodes in the relay node group 20 at the same time.

The processor 32 can initiate configuring at least one relay node according to the configuration information before the at least one relay node is handed over from the first base station 2, to the second base station 3 as shown in block 406. In some embodiments any means suitable can be used to initiate configuring the at least one relay node according to the configuration information before the at least one relay node is handed over from the first base station 2 to the second base station 3. The processor 32 at first base station 2 can initiate configuring the relay nodes 4, 5 of the relay node group by sending the determined configuration information to one or more relay nodes 4, 5. The processors 32 at relay nodes 4, 5 also contribute to the configuration.

This means that the impact of handing over the backhaul link between the relay nodes 4, 5 from the first base station 2 to the second base station 3 can be limited. For example the configuration of one or more relay nodes 4, 5 can be reconfigured to adjust properties of the relay nodes 4, 5 before handover. Reconfiguring the relay nodes 4, 5 prior to handover ensures that the configuration of the relay nodes 4, 5 best matches the capabilities of the second base station 3 to which the relay nodes 4, 5 are to be handed over.

The capability information can also be sent to the relay nodes 4, 5 so part of the reconfiguration can be decided at the first base station 2 and part can be decided directly at the relay nodes 4, 5.

Figure 5:
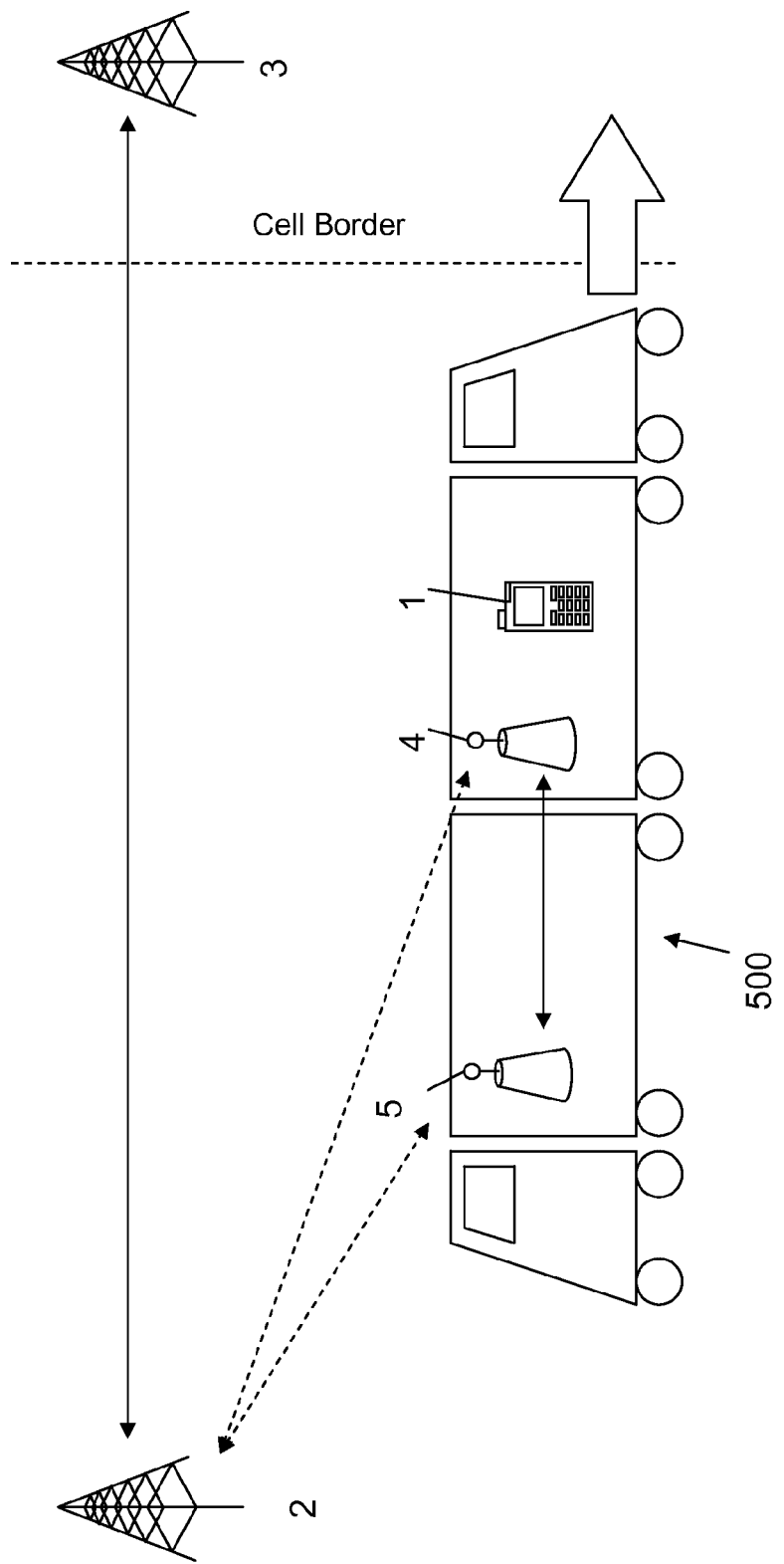
FIG. 5 shows a schematic representation of a relay node mounted on a vehicle according to some embodiments.
Figure 6:
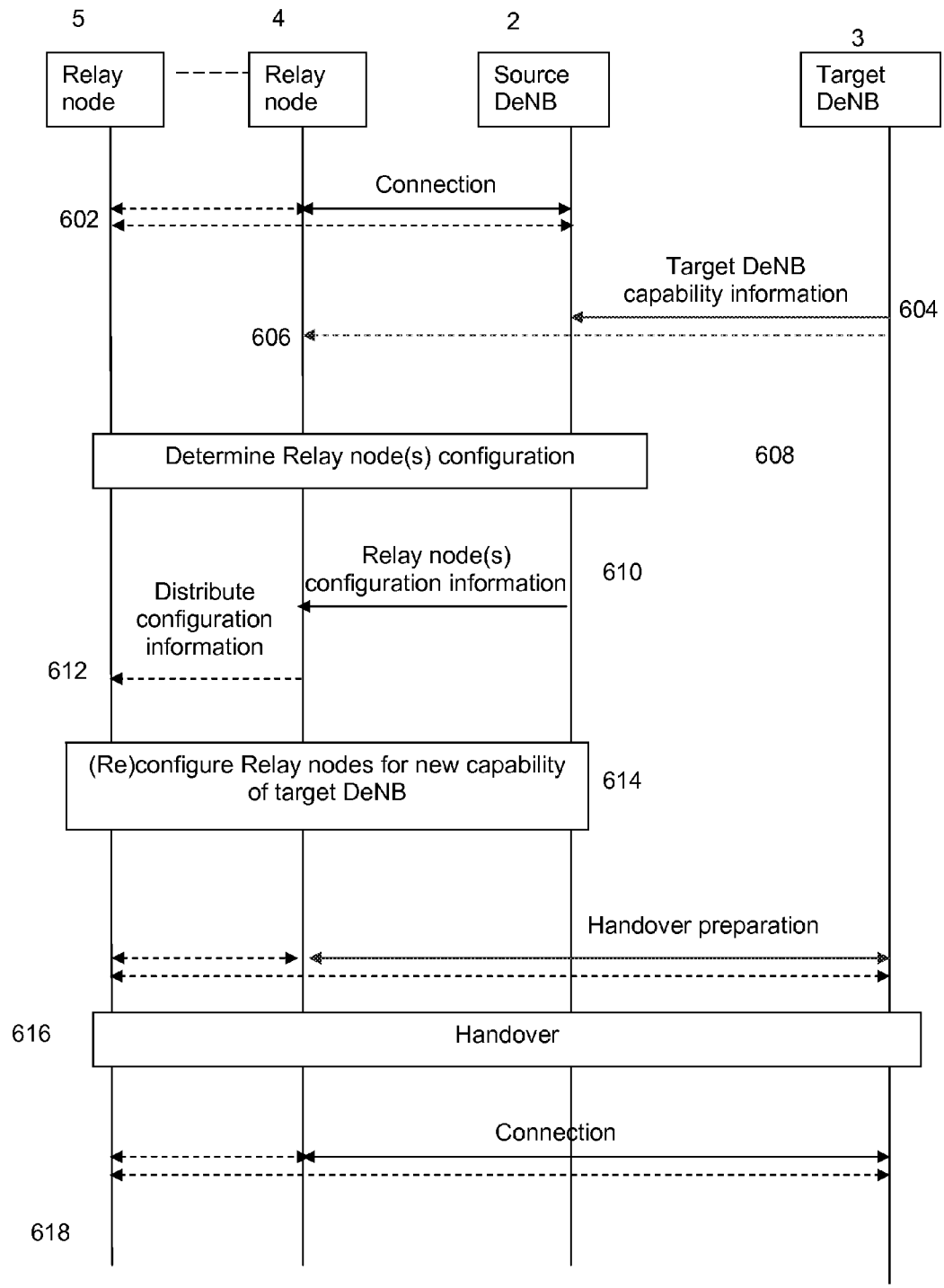
FIG. 6 shows a signalling diagram according to some embodiments.

Some more detailed embodiments will now be discussed with reference to FIGS. 5 and 6. FIG. 5 illustrates a schematic arrangement of relay nodes in a relay node group installed in a moving vehicle according to some embodiments. FIG. 6 illustrates a signalling diagram according to some embodiments.

One or more relay nodes 4,5 can form part of a relay node group 20 installed in a moving vehicle 500 such as a bus or a train. In other embodiments the relay node group 20 can be replaced with a single relay node. At a certain point, as shown in FIG. 5, the first relay node 4 has a connection established with the first base station 2 as shown by arrows 602 in FIG. 6. The second relay node 5 and other relay nodes in the relay node group 20 can also have connections established with the first base station 2, as illustrated by the dotted arrow between the second relay node 5 and the first base station 2. Alternatively, the second relay node 5 is in connection with the first relay node 4 and shares the backhaul link 22.

The second base station 3, which is the target donor eNB for the relay node group 20, sends capability information of the second base station 3 to the first base station 2 and to the first relay node 4 as shown in step 604. The second base station 3 can send the capability information to the first base station via any suitable communication link, such as a X2 communication link. The second base station 3 can send the capability information to directly to the first relay node 4 if the first relay node 4 is also within the cell area of the second base station or alternatively the capability information can be forwarded by the first base station 2, as shown in step 606.

Alternatively, in some other embodiments the capability information is sent only to the first base stations 2 and a control apparatus 6 of the first base station 2 can process the capability information of the second base station 3 without involving a control apparatus 13, 14 associated with one or more relay nodes. Indeed, the control apparatus 6 can perform alone the method according to the embodiments shown in FIG. 4. Additionally or alternatively, the capability information can be sent only to one or more relay nodes 4, 5 and a control apparatus 13, 14 associated with one or more relay nodes can process the capability information of the second base station 3 without involving the control apparatus 6 of the first base station 2. Indeed, the control apparatus of one or more relay nodes 4, 5 can perform alone the method shown in FIG. 4. Additionally or alternatively, in some other embodiments the capability information is sent to a network management entity (not shown) which can communicate with both the first and second base stations 2, 3. Additionally the network management entity can perform the method according to the embodiments shown in FIG. 4. Additionally or alternatively, in some other embodiments the capability information is sent to a self organising network (SON) entity, for example located in operation and maintenance (OAM) system (not shown) of the operator which can communicate with both the first and second base stations 2, 3 and relay nodes 4, 5. Additionally, the self organising network entity can perform the method according to the embodiments shown in FIG. 4.

The processor of a control apparatus (not shown) of the second base station 3 can send the capability information to the first base station 2 and to the relay nodes 4, 5 in response to an event. In some embodiments the event is the expiry of a timer and the second base station 3 sends the capability information after a period of time. Optionally the capability information can be sent periodically or randomly.

In some other embodiments the control apparatus of the second base station 3 can send the capability information to the first base station 2 and the relay nodes 4, 5 in response to an indication that the relay node group 20 is to be handed over to the second base station 3. The indication can be received at the second base station 3 from the first base station 2, or alternatively from the relay node group 20, or alternatively from a network managing entity (not shown) or alternatively from a self organising network entity (not shown).

The processor 32 of the first base station can determine when to send an indication that the relay node group 20 is about to be handed over to the second base station 3. As the relay node group 20 moves across the cell area of the first base station 2, the control apparatus 6 determines that the relay node group 20 may need to be handed over to a neighbouring base station 3. In some embodiments, the control apparatus 6 determines the velocity of the moving vehicle 500 from signal measurements. The control apparatus 6 can retrieve the size of the cell area of the first base station 2 from memory 31 and estimate the time and position at which the group of relay nodes 20 will enter the cell area of the second base station 3. In some embodiments the processor 32 of the control apparatus 6 sends information comprising an indication that the relay node group 20 will be handed over from the first base station 2 to the second base station 3. In some embodiments the indication comprises estimates of the time and location that the moving relay node group are to be handed over to the second base station 3.

In some alternative embodiments, the control apparatus 13 of the relay node can determine when to send an indication that the relay node group 20 is about to be handed over to the second base station 3. As the relay node group 20 moves across the cell area of the first base station 2, the control apparatus 13 determines that the relay node group 20 may need to be handed over to a neighbouring base station 3. The control apparatus 13 can determine the velocity of the moving vehicle 500 from signal measurements. The control apparatus 6 can retrieve the size of the cell area of the first base station 2 from memory 31 and estimate the time and position at which the group of relay nodes 20 will enter the cell area of the second base station 3. In some embodiments the processor 32 of the control apparatus 13 sends information comprising an indication that the relay node group 20 will be handed over from the first base station 2 to the second base station 3. Similarly, the indication can comprise estimates of the time and location that the moving relay node group are to be handed over to the second base station 3.

Additionally or alternatively, a network management entity, such as an MME or a SON entity can determine when to send an indication that the relay node group 20 is about to be handed over to the second base station 3. As the relay node group 20 moves across the cell area of the first base station 2, network management entity can determine that the relay node group 20 may need to be handed over to a neighbouring base station 3. The network management entity can likewise estimate the time and position at which the group of relay nodes 20 will enter the cell area of the second base station 3. The network management entity can send information comprising an indication that the relay node group 20 will be handed over from the first base station 2 to the second base station 3. Again, the indication can comprise estimates of the time and location that the moving relay node group are to be handed over to the second base station 3.

The processor 32 of the control apparatus 6 receives the capability information from the second base station 3 as shown in step 604. The processor 32 of the control apparatus 13, 14 receives the capability information from the second base station 3 as shown in step 606.

The capability information of the second base station 3 can comprises one or more of the following information regarding the cell of the second base station 3 candidate to handover the relay nodes 4, 5: the cell configuration, the size of the cell, the wireless technologies available in the cell, the frequency bands used in the cell, the carrier aggregation capabilities in the cell, the network topology, the load of the cell, the backhaul sub-frame allocation (i.e. the sub-frames assigned to serve fixed and moving relays), the amount of radio resources in the cell reserved for moving relays, the number of connected fixed and moving relays respectively, the maximum number of supported moving relays, the frequency bands used by connected fixed and moving relays on the access link. In some embodiments the load of the cell is the current load experienced by the second base station 3 if not sent using the LTE Rel.8/9/10 mobile load balancing procedures. In some further embodiments the capability information comprises also the overload indicator (OI), high interference indicator (HII) and Relative Narrowband Tx Power (RNTP) of the second base station 3 if not sent using common LTE Rel.8/9/10 inter-cell interference coordination procedures. Indeed, the capability information can comprise any information suitable for determining the configuration information of one relay or more nodes.

The control apparatus 6 and the control apparatus 13, 14 can then determine the relay nodes 4, 5 configuration based on the capability information of the second base station 3 as shown in block 608. For example, the processor 32 of control apparatus 6 may determine from the capability information of the second base station information that the moving relay node group 20 cannot maintain its current load on the backhaul interface 22 after handover. The processors 32 of control apparatus 13, 14 may determine from the capability information of the second base station information that the moving relay node group 20 cannot maintain its current load on the access interface 21 after handover. The processors may determine this from indications of the capability information including the current available reserved radio resources, the current load and the number of moving relays in the cell area of the second base station 3.

That is, the processors 32 in the first base station 2 and at least one relay node of the relay node group 20 may determine that load of the moving relay node group 20 on interface 22 and/or interface 21 exceeds the reserved available radio resources of the second base station 3. The processors 32 in the first base station 2 and at least one relay node of the relay node group 20 can then determine a configuration of the relay node group 20 which matches the load of the relay node group 20 to the available reserved radio resources of the second base station 3.

The control apparatus 6 may initiate reducing the data rate of radio bearer in order to reduce the load on the interface 22 of the relay nodes 4, 5. In some embodiments the control apparatus 6 is configured to reduce the data rate of the radio bearers according to the priority of the use of the radio bearer. The control apparatus 13, 14 may initiate reducing the data rate of radio bearer in order to reduce the load of the relay nodes 4, 5. In some embodiments the control apparatus 13, 14 are configured to reduce the data rate of the radio bearers according to the priority of the use of the radio bearer.

Block 608 illustrates that the configuration information of the relay node(s) can be determined by both the control apparatus 6 of the first base station 2 and the control apparatus 13 of the relay node 4. For example, the configuration information can be partly determined at the first base station 2, for example, the sub-frames used for backhauling 22, and can be partly determine at the relay node 4, for example, the frequency band used on the access link 21. In this way the determination of the configuration information can be more efficient.

Once the control apparatus 6 determines the relay node configuration information, the control apparatus sends the configuration information to one or more of the relay nodes 4, 5 of the relay node group 20 as shown in step 610. For example if the backhaul sub-frame configuration is changed by the control apparatus 6, the new configuration needs to be informed to the relay node group 20 because the relay nodes 4, 5 have to update the MBSFN configuration of the access interfaces 21. In some embodiments, a single relay node may be in communication with the first base station 2 and the backhaul link 22 is shared by a plurality of relay nodes in the relay node group 20. In this way, the first relay node 4 can be in communication with the first base station 2 and can receive configuration information for one or more other relay nodes. The control apparatus 13 of the relay node 4 can determine that the configuration information should be distributed to, for example, the second relay node 5 and the control apparatus 13 distributes the configuration information to the second relay node 5 as shown in step 612.

On receiving the configuration information from the first base station 2, the control apparatus 13 initiates reconfiguration based on the configuration information as shown in step 614. In some embodiments the reconfiguration is only applied when the hand over to the cell of the target base station takes place in order to avoid unnecessary throughput reductions. The relay nodes 4, 5 are then reconfigured to best match the capabilities of the second base station 3.

In some embodiments the control apparatus 13 of the first relay node 4 determines that the relay nodes 4, 5 need to change the way they operate in the cell area of the second base station 3 compared to the current operation in the cell area of the first base station 2. For example, if the control apparatus 13 determines that the load of the relay nodes 4, 5 needs to be reduced to match the available reserved resources of the second base station 3, the relay nodes 4, 5 can perform some advanced reconfiguration measures. The control apparatus 13 can reconfigure the relay nodes 4, 5 according to the configuration information. In some embodiments the first base station 2, that is the source base station, carries out reconfiguration of some aspects of the relay nodes 4, 5. For example, if the Un sub-frame is reconfigured it can require that the relay node 4,5 reconfigures the MBSFN sub-frames on the RN-UE link. Furthermore, the first base station 2 also transmits to the relay node 4, 5 within these reconfigured sub-frames. Similarly, if the carrier frequency used for the Un interface is changed, this requires reconfiguration actions at both the relay node 4, 5 and the first base station 2.

Once the relay nodes 4, 5 have been reconfigured the relay node group 20 can initiate handover preparation and handover from the first base station 2 to the second base station 3 as shown in step 616. The relay nodes 4, 5 can then use the established connection with the second base station 3 as shown in step 618, similar to the step 602 discussed above.

Advantageously, receiving capability information from a target base station allows prior configuration of a relay node before the relay node is handed over to the target base station. This means measures can be taken to manage traffic control on the backhaul link 22 due to capacity reasons and further re-arrange the services of communication devices 1 belonging to the cell of the moving relay node to handle quality of service requirements on the access link 21. This means that a period of time after handover is avoided whereby measures are taken to reduce capacity. The communication devices do not experience higher handover delay and the quality of service is improved to the communication devices.

In some further embodiments there can be a plurality of moving vehicles 500 in the cell area of the first base station 2 or other cell areas of base stations neighbouring the second base station 3. Accordingly the second base station 3 can send capability information to a plurality of base stations 2 and to a plurality of moving vehicles 500 wherein the coverage of the moving relay node groups 20 are about to move into the cell area of the second base station 3.

The second base station 3 may receive a request to send capability information to the first base station 2 or another base station and to moving relay group node 20 in which there is a moving relay moving towards the second bases station 3. The first base station 2 in some embodiments can determine that the moving relay node group 20 is moving towards the second base station 3 and hence determine the moving relay node group 20 may require handover. The processor 32 can determine the movement of the moving relay node group 20 from one or more methods for determining the route of the moving relay. In some embodiments the moving relay node group 20 may be installed on a vehicle 500 which is moving along a predetermined route, such as a bus route or a train line. The processor 32 may also know the usual timings for the moving vehicle for example the processor may refer to bus or train timetables. Alternatively the processor may receive information from navigation apparatus associated or installed on the moving vehicle 500. Additionally or alternatively the processor 32 can determine which previous cells the moving relay node group have passed through and determine which cells the moving relay is most likely to pass through next. Once the processor 32 of the first base station has determined or estimated which cell the moving relay node group 20 is going to be handed over to, the processor 32 sends a request for capability information from the base station associate with the cell. It is described in case the request for capability information is sent from the first base station, it can also be sent by the moving relay node group 20, by the mobility management entity or by the self organising network entity.

In some embodiments the control apparatus 6 of the first base station 2 or the control apparatus 13, 14 of the relay nodes can determine whether to handover to the second base station 3 based on the capability information. For example, the capability information can comprise information regarding the size of the second base station 3. A determination can be made by either the control apparatus of the relay node or the first base station whether handover to the second base station 3 is optimal. If the size of the cell of the second base station 3 is very small, for example a picocell, then a subsequent handover will be required very shortly after handing over to the second base station 3 associated with a small cell. Instead, the processor 32 can determine not to handover to the second base station 3, but rather handover to another base station having a larger macro cell. The processor 32 can determine not to handover to the second base station 3 even if the load or signal to interference plus noise ratio (SINR) conditions indicate handover would be favourable because the processor 32 determines the size of the cell is small.

In some embodiments the processor 32 can determine whether to handover to a base station having a small cell based on the size of the cell area and/or the speed of the moving relay node group 20. The processor 32 can determine whether the predicted length of time the moving relay node group 20 will be in the small cell is above an amount of time which is maintains an optimal service for communication devices belonging to the relay node group 20.

In some embodiments the control apparatus 6 of the first base station 2 or the control apparatus 13, 14 of the relay nodes 4, 5 can determine when to configure the relay nodes 4, 5. The control apparatus 6 or the control apparatus 13, 14 can determine the velocity of the moving relay node and determine the length of time that the moving relay node group 20 will spend still in the cell area of the first base station 2. The control apparatus 6 or the control apparatus 13, 14 can determine whether the moving vehicle is, for example, slowing down and therefore can postpone reconfiguration of the relay nodes 4, 5 for handing over to the next cell area. This means that the service to the communication devices belonging to the cell(s) of the moving relay node group 20 can be improved by not e.g. reducing the capacity of the relay node group 20 too early and maintaining the best level of service.

In some embodiments the first base station 2 and relay node group 20 receives capability information from a plurality of second base stations 3. That is, the first base station 2 and relay node group 20 may receive information from two or more base stations with overlapping cell areas and the control apparatus 6 or control apparatus 13, 14 can determine which base station the moving relay node group 20 should be handed over to based on the capability information. Additionally or alternatively the first base station and relay node group receives capability information from a plurality of base stations having cell areas which are located along the determined movement path of the moving relay node group 20. That is, the first base station 2 and relay node group 20 receive the capability information from the base stations which the moving relay node will travel through. In this way, capability information for base stations of a series of subsequent handovers can be received and stored in memory. Furthermore the processor 32 of the control apparatus 6 and/or the control apparatus 13, 14 can determine the time and location of a plurality of subsequent handovers and provide for network optimisation. The capability information of a plurality of second base stations can be received at the first base station 2 and at the relay node group 20 via a single target base station, for example the next target base station. The series of subsequent target base stations can send the capability information to the next target base station 3 via the X2 communication link. This means that handover overhead and capacity loss can be reduced because the time estimated for handover can be taken into account.

In the case of a plurality of second base stations 3 the control apparatus 6 of the first base station 2 might decide not to forward all the information capabilities to the relay node group 20 but only a subset of the second base stations of the plurality of the second base stations. Indeed the control apparatus is configured to select the capability information of only one second base station 3. For example the control apparatus can determine whether or not the current capability of a second base station 3 can satisfy the requirements for the relay group 20 the first base station 2. If the control apparatus determines that the capability of a second base station 3 cannot satisfy the requirements, the control apparatus decides that it does not need to forward the information to the relay group 20. This can save overhead on the backhaul interface 22 between the first base station 2 and the relay group 20 that is a wireless link.

In some embodiments the capability information can be received at a control apparatus 13, 14 or one or more relay nodes 4, 5 via a communication link between moving relay node groups. In some embodiments the moving vehicles 500 can comprise vehicle to vehicle communication links. The vehicle to vehicle link can be a cellular link or a private non-cellular link. This means that a vehicle in or leaving the cell area of a base station can pass on current capability information of a cell area of a base station to a vehicle which is approaching the cell area of the base station. Alternatively the moving relay node group 20 can broadcast the capability information to any other potential moving relay node groups 20. The broadcast of the capability information can be similar to a broadcast from a fixed eNB. This means that another moving relay node whilst monitoring fixed cells for handover can also receive the capability information from the moving relay node group broadcast. The moving relay node group broadcast needs to be distinguished from a fixed cell and any suitable information, for example header information, can be used to achieve this.

Advantageously the moving relay node group can be reconfigured with respect to a base station which the moving relay node group is to be handed over to. The moving relay node can adjust the traffic of the served UEs according to the expected capacity in the DeNB cell. The processor 32 can evaluate the overload indicator (OI), the high interference indicator (HII) and the relative narrowband Tx power (RNTP) information or any other information in an inter-cell interference coordination messages provided by the target DeNB, and re-schedule users to minimize interference.

Furthermore the relay nodes 4,5 can be reconfigured to activate or de-activate and reconfigure multi band or multi technology for the backhaul according to the bands used in the target base station cell 3. If the target base station 3 is using in-band backhauling on a different carrier from the carrier used by the source base station 2, the moving relay node group 20 can reconfigure the carrier used for backhauling and access in advance e.g. before connecting to the target base station 3. Advantageously this avoids reconfiguring the in-band backhauling after handover and avoids introducing delay. In particular the sub-frames do not need to be configured for backhauling after handover as Multi-Media Broadcast over a Single Frequency Network (MBSFN) sub-frames are already configured at the moving relay for the served UEs on the access interface 21. This avoids a delay which would depend on when the relay node could signal to the communication devices the new MBSFN pattern after handover. For example, considering a moving relay node group 20 mounted on a high speed train, the train is in the rural area (served by source base station 2) and it is approaching a dense urban area (a city served by target base station 3). Control apparatus 6 or 13, 14 can determine it is better to perform the reconfiguration when the train is still in the rural area because probably the load of the first base station 2 may be not that high and can allow a more flexible reconfiguration compared to doing the reconfiguration when the moving relay group 20 is already connected to the target base station 3. For example, the reconfiguration could be done in two or more steps when connected to source base station 2 instead of only one, and this can limit the impact to the user equipments on the train served by the moving relay node group 20.

In some embodiments the reconfiguration of the relay node can comprise adjusting the power control range of the moving relay node group to the deployment of the target base station cell 3. The relay node group 20 can also be configured to adjust for different technologies e.g. if the moving relay node group provides LTE services in the vehicle, but moves out of LTE coverage of base stations, in which case the backhaul link can be switched e.g. to High Speed Packet Access (HSPA).

In some embodiments the moving relay node group 20 may support multiple air interface technologies and can use a single backhaul technology. Alternatively the moving relay node group 20 can operate with multiple backhauls using different wireless technologies. The control apparatus for the first base station 2 and the moving relay node group 20 can analyse the needs for backhaul capacity, and can check the quality of the match with the target cell capabilities.

In some embodiments, the moving cell can throttle data flow for non real time service (NRT) users, and give preference to retain capacity for real time service (RT) users.

It is noted that whilst embodiments have been described in relation to LTE-Advanced, similar principles can be applied to any other communication system. Also, instead of carriers provided by a base station a carrier comprising component carriers may be provided by a communication device such as a mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

Furthermore, whilst embodiments have been described in relation to relay nodes, similar principles can be applied to any station being handed over between other stations. For example there are some embodiments wherein the aforementioned principles can be applied to mobile stations, such as user equipments or communication devices or any access node such as base stations.

It is also noted herein that while the above describes exemplifying embodiments of the invention, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more of any of the other embodiments previously discussed.

The invention claimed is:

1. A method of initiating configuration of at least one station comprising; comprising:
receiving capability information of at least one second base station when the at least one station is within a cell area of a first base station;
determining some configuration information of the at least one station based on the received capability information; and
initiating configuring of the at least one station according to the configuration information before the at least one station is handed over from the first base station to the at least one second base station, wherein the method comprises determining differences between the capability of the first base station and the at least one second base station, and wherein the determining configuration information further comprises determining reconfiguration information based on the capability differences between the first base station and the at least one second base station.

2. The method of claim 1 wherein the capability information is received from the at least one second base station at the first base station and the first base station determines at least a part of the configuration information of the at least one station, and wherein the method further comprises sending the configuration information to the at least one station to initiate configuring the at least one station.

3. The method of claim 1 wherein the capability information is received from the at least one second base station at the at least one station and the at least one station determines at least a part of the configuration information of the at least one station, and wherein the method further comprises receiving at least a part of the configuration information for the at least one station from the first base station.

4. The method of claim 1 wherein the at least one station is moving from the first base station to the at least one second base station.

5. The method of claim 1 wherein the determining the configuration information comprises determining the available capacity of the at least one second base station, and wherein the determining configuration information further comprises determining reconfiguration information to modify the load of the at least one station to match the available capacity of the at least one second base station.

6. The method of claim 1 wherein the capability information of the at least one second base station comprises one or more of the following: the cell configuration of at least one second base station, the size of at least one second base station, the wireless technologies available at the at least one second base station, one or more frequency bands used by the at least one second base station, carrier aggregation capabilities used in the at least one second base station, the network topology at the at least one second base station, and load of the at least one second base station, the backhaul sub-frame allocation of at least one second base station, the amount of reserved radio resources for moving at least one station at the at least one second base station, the number of connected fixed and moving at least one station respectively at the at least one second base station, the maximum number of supported moving at least one station at the at least one second base station, the frequency bands used by connected fixed and moving at least one station at the at least one second base station.

7. The method of claim 1 wherein capability information of a plurality of second base stations is received, and wherein the method further comprises selecting a second base station to which the at least one station is to be handed over based on the received capability information of a plurality of second base stations, and wherein the selecting comprises selecting the second base station based on one or more of the following: the size of the second base station and the speed of the at least one station.

8. The method of claim 7 wherein the capability information for the plurality of second base stations comprises capability information for a series of second base stations, whereby cell areas of the second base stations are located along a movement path of the at least one station.

9. The method of claim 7 wherein a vehicle comprises the at least one station, and wherein the method further comprises receiving the capability information from one or more other vehicles in at least one second base station.

10. The method of claim 1 comprising estimating the time and or the location of the relay node when handover of the at least one station occurs, and wherein the method further comprises sending information comprising handover estimates for preparing one or more second base stations for handover of the at least one station.

11. A method of initiating configuration of at least one station comprising, comprising:
sending capability information of at least one second base station when the at least one station is within a cell area of a first base station,
the capability information being for determining configuration information of the at least one station for configuring the at least one station according to the configuration information before the at least one station is handed over from the first base station to the at least one second base station, wherein the method comprises determining differences between the capability of the first base station and the at least one second base station, and wherein the determining configuration information further comprises determining reconfiguration information based on the capability differences between the first base station and the at least one second base station.

12. The method of claim 11 wherein the method comprises initiating sending capability information in response to an indication that the at least one station is to be handed over to the at least one second base station, and wherein the method further comprises sending the capability information to a plurality of other base stations and to a plurality of stations.

13. A computer program product embodied on a non-transitory computer-readable medium in which a computer program is stored that, when being executed by a computer, is configured to provide instructions to control or carry out the method of claim 1.

14. An apparatus for initiating configuration of at least one station comprising:
at least one processor; and
at least one memory including computer program code,
the at least one memory and the computer program code configured, with the at least one processor, to cause the apparatus to perform at least the following:
receiving capability information of at least one second base station when the at least one station is within a cell area of a first base station;
determining some configuration information of the at least one station based on the received capability information; and
initiating configuring of the at least one station according to the configuration information before the at least one station is handed over from the first base station to the at least one second base station wherein the at least one memory and the computer program code are further configured to cause the apparatus to perform at least the following:
determining differences between the capability of the first base station and the at least one second base station; and
wherein determining configuration information determines reconfiguration information based on the capability differences between the first base station and the at least one second base station.

15. The apparatus of claim 14 wherein the capability information is received from the at least one second base station at the first base station and the first base station determines at least a part of the configuration information of the at least one station, and wherein the at least one memory and the computer program code are further configured, with the at least one processor, to cause the apparatus to perform at least the following: sending the configuration information to the at least one station to initiate configuring the at least one station.

16. The apparatus of claim 14 wherein the capability information is received from the at least one second base station at the at least one station and the at least one station determines at least a part of the configuration information of the at least one station, and wherein the at least one memory and the computer program code are further configured, with the at least one processor, to cause the apparatus to perform at least the following: receiving at least a part of the configuration information for the at least one station from the first base station.

17. The apparatus of claim 14 wherein determining the configuration information determines the available capacity of the at least one second base station, and determines reconfiguration information to modify the load of the at least one station to match the available capacity of the at least one second base station.

18. The apparatus of claim 14 wherein the capability information of the at least one second base station comprises one or more of the following: the cell configuration of at least one second base station, the size of at least one second base station, the wireless technologies available at the at least one second base station, one or more frequency bands used by the at least one second base station, carrier aggregation capabilities used in the at least one second base station, the network topology at the at least one second base station, and load of the at least one second base station, the backhaul sub-frame allocation of at least one second base station, the amount of reserved radio resources for moving at least one station at the at least one second base station, the number of connected fixed and moving at least one station respectively at the at least one second base station, the maximum number of supported moving at least one station at the at least one second base station, the frequency bands used by connected fixed and moving at least one station at the at least one second base station.

19. The apparatus of claim 14 wherein capability information of a plurality of second base stations is received.

20. The apparatus of claim 14 wherein a vehicle comprises the at least one station, and wherein the at least one memory and the computer program code are further configured, with the at least one processor, to cause the apparatus to perform at least the following: receiving the capability information from one or more other vehicles in at least one second base station.

21. An apparatus for initiating configuration of at least one station comprising:
at least one processor; and
at least one memory including computer program code,
the at least one memory and the computer program code configured, with the at least one processor, to cause the apparatus to perform at least the following:
sending capability information of at least one second base station when the at least one station is within a cell area of a first base station, the capability information being for determining configuration information of the at least one station for configuring the at least one station according to the configuration information before the at least one station is handed over from the first base station to the at least one second base station, wherein the at least one memory and the computer program code are further configured to cause the apparatus to perform at least the following:
determining differences between the capability of the first base station and the at least one second base station; and
wherein determining configuration information determines reconfiguration information based on the capability differences between the first base station and the at least one second base station.

22. The apparatus of claim 21 wherein the at least one memory and the computer program code are further configured, with the at least one processor, to cause the apparatus to perform at least the following:
initiating sending capability information in response to an indication that the at least one station is to be handed over to the at least one second base station, and
sending the capability information to a plurality of other base stations.

23. A computer program product embodied on a non-transitory computer-readable medium in which a computer program is stored that, when being executed by a computer, is configured to provide instructions to control or carry out the method of claim 11.

* * * * *